United States Patent
Evalds et al.

[15] 3,684,171
[45] Aug. 15, 1972

[54] CIRCUIT FOR MONITORING A TEMPERATURE RELATED CONDITION AND FOR CONTROLLING A HEAT GENERATING DEVICE

[72] Inventors: Egils Evalds, Ardmore, Pa. 19003; Ernest F. Coccio, Conshohocken, Pa. 19428

[73] Assignee: Athena Controls, Inc., West Conshohocken, Pa.

[22] Filed: July 29, 1970

[21] Appl. No.: 59,073

[52] U.S. Cl..................236/78, 219/499, 307/252 N, 317/148.5 B
[51] Int. Cl..........................G05d 23/24, H03k 17/68
[58] Field of Search.........236/78, 46, 46 F; 317/132, 317/153, 148.5 B; 219/505, 499; 431/66; 307/310, 252 N

[56] References Cited

UNITED STATES PATENTS

| | | |
|---|---|---|
| 3,483,359 | 12/1969 | Hewlett, Jr. et al....219/499 X |
| 3,419,214 | 12/1968 | Evalds...................236/68 B X |
| 3,321,641 | 5/1967 | Howell....................307/310 X |
| 3,548,156 | 12/1970 | Davey.........................219/499 |
| 3,376,512 | 4/1968 | Janssen et al..........307/310 X |

*Primary Examiner*—William E. Wayner
*Attorney*—William E. Cleaver

[57] ABSTRACT

The present invention employs a heat sensitive element to form one leg of a bridge circuit, with the bridge circuit providing the bias signals necessary to generate control signals. The present invention also includes a memory circuit connected to the bridge circuit, with said memory circuit acting to remember the presence or absence of a control signal. Further, the present invention includes switching means which is circuitry connected to activate the heating element. The switching means is also connected to the memory circuit whereby the memory circuit acts to store, or remember, a control signal during the first half of an a. c. supply signal the switching circuit acts in response to the stored control signal to turn on the heater.

3 Claims, 1 Drawing Figure

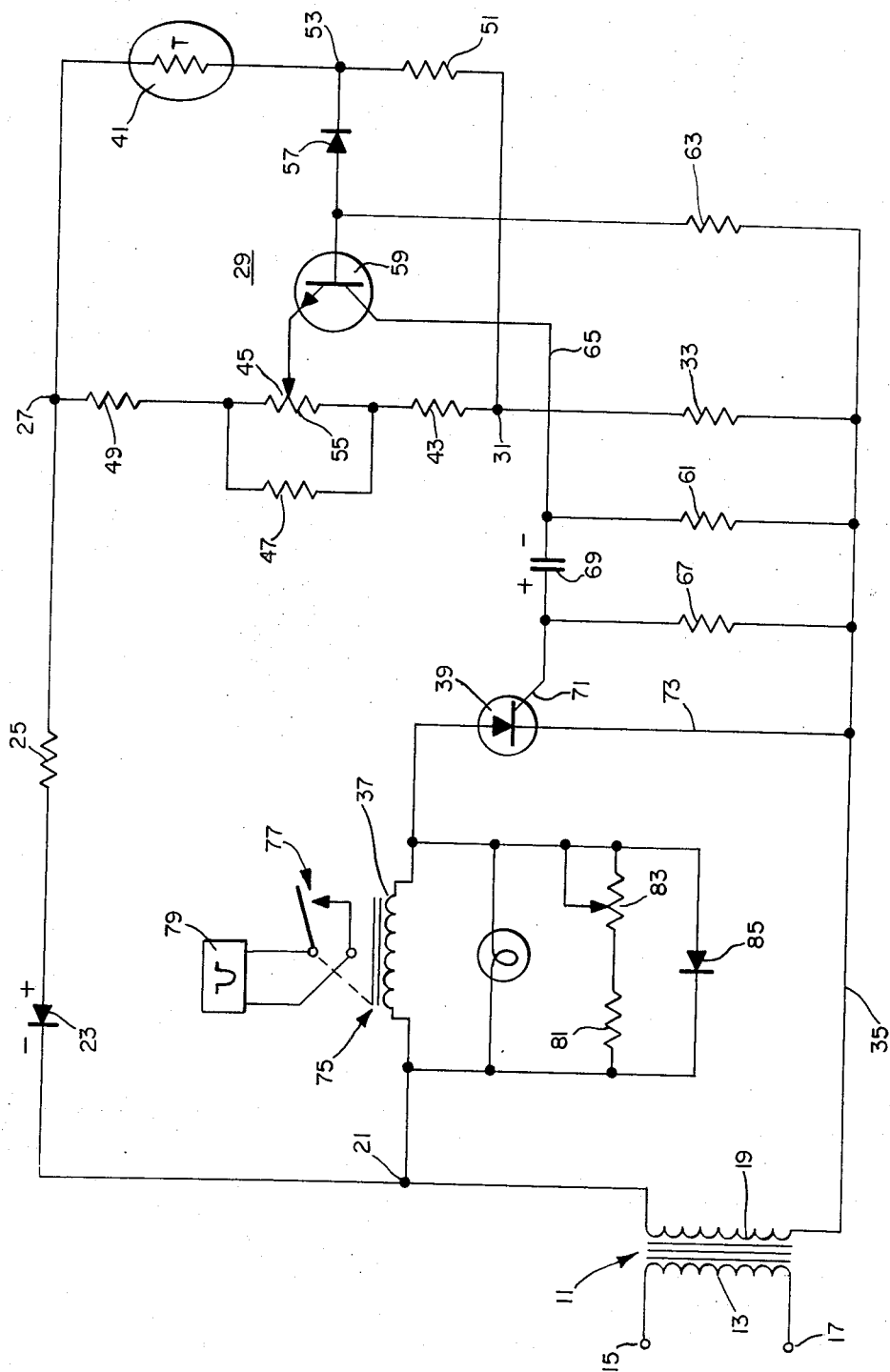

CIRCUIT FOR MONITORING A TEMPERATURE RELATED CONDITION AND FOR CONTROLLING A HEAT GENERATING DEVICE

DESCRIPTION

The present invention relates to circuits which monitor temperature related conditions and which control heat generating devices in connection therewith and in particular to such a device which monitors during one half of an a. c. supply signal and which renders the heating element operating during the second half of the a. c. supply signal.

There are many circuits in the heating control art which monitor a room or a furnace which is to be heated or held at a constant temperature. These circuits further act to turn on a heating means in response to their detecting a temperature which is lower than some particular threshold value. Most of these circuits have compensating features which serve to mitigate the problems that arise from variations of the line voltage. In other words, if there are variations of the line voltage, as so often occurs, these variations tend to cause switching circuits to misfire and accordingly the prior art control and monitoring circuits are usually provided with some features to compensate for line voltage variations. Closely related to this problem is the problem of noise or spurious signals which tend to misfire a switching circuit or turn it off prematurely. At least one effort to overcome this problem is the arrangement of having the circuit fire late in the half cycle, i.e., when the applied voltage approaches its maximum value. This arrangement however is burdened with the problem that there is often times insufficient power to fire relay circuits because only half of the energy is available when the a.c. signal has reached its maximum value.

SUMMARY

The present circuit overcomes the above problems by generating a control signal during the first half of an a.c. supply signal and remembering or storing this control signal. During the next half of the a.c. cycle the remembered or stored control signal is employed to turn on a switching circuit which energizes a relay to turn on a heater. Obviously, if the monitored condition is at its correct temperature there will be no control signals stored and hence the heater will not be turned on. By having the monitor operating on one-half of the cycle and the heater turned on during the other half of the cycle, voltage variations, whether they are due to poor line voltage regulation or noise, will not misfire the switching circuit.

The features and objects of the present invention will become more meaningful in conjunction with the following description taken along with a study of the drawing.

In the drawing there is depicted a transformer 11, the primary winding 13 thereof being connected to a source of power at the terminals 15 and 17. The secondary winding 19 of the transformer 11 provides the electrical current source for the circuit. The upper portion of the secondary winding 19 is connected from the terminal 21, through a first diode 23, through the resistor 25, to the first input terminal 27 of the bridge circuit 29. The second input terminal 31 of the bridge circuit 29 is connected through the resistor 33 to the lower side of the secondary winding and is actually connected thereto by the common line 35.

When there is a.c. power applied to the primary winding 13 there is an induced a.c. signal in the secondary winding 19, the bridge circuit only receives power on the half cycle that the diode 23 becomes biased in accordance with the polarity shown across the diode. In other words, when the point 21 goes negative there is current from the lower terminal of the secondary winding 19, along the common line 35, through the resistor 33, across the bridge 29, through the resistor 25, through the diode 23, to the terminal 21. During the other half cycle when the terminal 21 goes positive the diode 23 prevents any current flow through the circuit just described and hence the bridge circuit is removed from active participation in the overall circuitry shown in the drawing.

On the other hand, the circuit formed by the circuitry connected from the terminal 21, through the relay coil 37, through the silicon control rectifier 39, to the common wire 35 operates during the half cycle when the terminal 21 goes positive if at that time the silicon control rectifier 39 has been turned on.

OPERATION

Consider now the operation of the circuit. It should first be established that the thermistor 41 operates such that if the temperature of the thermistor goes low, or becomes cold, the resistance of the thermistor increases or becomes high. It should be apparent that other forms of heat sensitive elements might be used and the position of such an element in the bridge might have to be altered depending upon the characteristics.

Bearing the foregoing in mind, we find that during the negative half cycle, that is the half cycle at which point 21 becomes negative, there is current flow across from the lower terminal of the secondary winding 19, along the common wire 35, through the resistor 33, to the terminal 31. The current then splits and passes along one path through the resistor 43, through the parallel potentiometer 45 and resistor 47, through the resistor 49 to the terminal 27. The second current path is through the resistor 51 through a temperature sensitive element the thermistor 41 and the terminal 27. From the terminal 27 the current passes through the resistor 25, through the diode 23 to the negative terminal 21.

Now in accordance with well understood bridge circuitry, if the thermistor temperature is cold so that its resistance is high the voltage drop thereacross will be relatively high and hence the voltage at a first output terminal 53 will be higher than the voltage at a second output terminal the tap 55 of the potentiometer 45. The bridge 29 will be considered unbalanced in a first direction when the voltage at tap 55 is higher than the voltage at output terminal 53 and unbalanced in a second direction when the voltage at output terminal 53 is higher than the voltage at tap 55. It will be noted that connected across the terminal 53 and the adjustable point 55 are first and second current steering means, i.e., a diode 57 and an NPN transistor 59. If the voltage at terminal 53 is higher than the voltage at tap 55, as under the conditions just described, then the current passing through the resistor 63 will find a low impedance path through the base emitter junction of the transistor 59 and hence the transistor 59 will be biased for conduction. It will be recalled that we are first considering the negative half cycle of the a. c. supply voltage which provides a positive voltage on line 35 and hence the transistor 59 "sees" this high voltage on line 35 through the resistor 61 and the transistor 59 is accordingly rendered conducting.

When the transistor 59 conducts there is current supplied to the collector thereof through two paths. The first path is through the resistor 61, along the line 65 and the second path is through the resistor 67, through the capacitor 69, along the line 65. As the current passes through the second path the capacitor 69 becomes charged in accordance with the polarity shown thereon. When the capacitor 69 is fully charged there is no longer any current passing through the second path.

When the a. c. supply signal swings into the positive half cycle, that is, when the terminal 21 is rendered positive, the lower half of the secondary winding is rendered negative Hence the common line 35 is rendered negative and therefore the transistor action is terminated and the bridge circuit is effectively removed from the circuit activity. However, during this positive half cycle the capacitor 69 commences to discharge through the resistor 67 and through the resistor 61 to the other side of the capacitor. This discharge activity of course provides a voltage bias across the resistor 67 which effects the bias across the control element 71 and the cathode element of the silicon control rectifier 39. Accordingly, the silicon control rectifier 39 is fired and there is current flow from the terminal 21, through the relay winding 37, through the silicon controlled rectifier 39 to the other side of the secondary winding 19. When current flows along this last described path, the relay 75 is activated and the relay points 77 are closed. There is connected to the relay points 77, as shown schematically, a utility device 79 which represents the heater. Once the relay points 77 are closed the heater is turned on to heat up the condition, i.e., the room, the furnace, etc. which the present circuit is monitoring.

It becomes apparent then that the circuit composed of the resistor 67, 61 and capacitor 69 is a memory circuit wherein the control signal generated by an unbalance of the bridge circuit is stored during the negative half cycle. During the half cycle which follows the generation of the control signal, the memory circuit acts to turn on the silicon controlled rectifier which in turn activates the relay circuit to provide energy to the heating device.

It follows that as the thermistor 41 becomes warmer in response to the heating element being turned on, the voltage at terminal 53 will become lower and accordingly some of the current passing from resistor 63 will be directed through the diode 57. Finally, as the voltage at terminal 53 becomes lower than the voltage at tap 55, the low impedance path will be across the diode 57 and not through the transistor 59. The foregoing transfer of current will cause the transistor action to cease.

The potentiometer 45 is used to provide a fine adjustment of the bridge. The resistor 81 is located in close proximity to the diode 57. The resistors 81 and 83 act as an anticipation control to lower the resistance of the diode 57 in keeping with the activity of the transistor 59. In other words, if the transistor 59 is continually turned on so that the relay 37 is continually energized during the positive half cycle then the heater element will be continually turned on and the inertia of the heater activity will cause the room or condition to continually heat up even after the energy to the heater has terminated, i.e., after the transistor 59 has been turned off. If, however, the resistance of diode 57 is decreased in response to continued heater activity, then the impedance path between the base of the transistor 59 and the point 53 will have been sufficiently lowered that at an earlier instant in time than "normally" the transistor will be turned off. If this were not the case by the time that the point 53 would arrive at its "normal" value to cut off the transistor 59, the inertia of the heating element would override the temperature at which the room condition was to be kept. To state this another way if the heater element has been turned on repeatedly for a long period of time then even after it is turned off it is going to radiate heat and the condition (room, furnace, etc.) that is being heated might be increased to the temperature in great excess of what was intended. In anticipation of this action, the diode 57 is heated by the resistors 81 and 83 and its resistance becomes variable. The resistor 83 is adjustable so that the heating of diode 57 can be set whereby at the very first instant that the transistor action should be turned off it will turn off. On the other hand, if the heating element is only turned on for a few cycles to provide only a small amount of heat then the diode 57 will not have been heated as much and its resistance will not have been decreased as much but the inertia of the heating element is not as great and therefore the condition does not warrant as great anticipatory adjustment.

The diode 85 is provided to permit the charge stored in the coil 37 to be discharged rapidly during the negative half cycles when the relay is not closed.

It should be understood that the memory circuit not only serves to store and remember that a control signal has been generated during the negative half cycle but it also serves to eliminate the problems which result from bad line voltage regulations or spurious signals. For instance, if there are voltage variations on the input or there are noise signals arising in the circuitry, these spurious signals have no effect on switching the heating element because they are simply dampened or integrated. When the capacitor 39 is fully charged by the transistor 59 action such distortions will have no effect. During the positive half cycle the silicon control rectifier 39 is turned on by the charge on capacitor 69 and cannot be turned on spuriously because the spurious signals are isolated from the control element. In addition, we have found that if a silicon control rectifier is switched on with a great deal of voltage applied from anode to cathode there are high frequency pulses generated. This is not the case in the present circuit. In the present circuit, the bias from the control element 71 to the cathode 73 is present from the very moment that the positive half of the cycle commences but the positive half of the cycle commences from a zero potential and builds up thus eliminating any of the high frequency noise signals which tend to be generated when a silicon control rectifier is fired with an already high voltage from anode to cathode. Further in addition relay coil 37 is provided with the full current of one half cycle. In other words, this relay is not subject to being fired or turned on during the latter half of one half of a cycle as is usually the case in circuits which are used or which have features to eliminate the noise problem described earlier. The current for the entire half cycle eliminates any possibility of the relay fluttering or dropping out because there is either full power or no power applied to the relay coil 37.

What is claimed is:

1. A circuit for monitoring a temperature related condition and controlling a heater device comprising in combination: a source of a. c. electrical energy having first and second terminals, said source of a. c. electrical energy providing alternately out of phase first half cycle electrical energy and second half cycle electrical energy; first diode means; a bridge circuit having first and second input terminals and first and second output terminals, said bridge circuit having its first input terminal connected through said first diode means to said first terminal of said source of a. c. electrical energy and its second input terminal connected to said second terminal of said source of a. c. electrical energy so that electrical current can pass through said bridge circuit only during the presence of said first half cycle electrical energy, said bridge circuit having one leg thereof comprising a temperature sensitive element; first and second current steering means, said first current steering means connected to said first output terminal to steer current therethrough in response to said first current steering means being activated, said second current steering means connected to said second output terminal to steer current therethrough in response to said second current steering means being activated, said first current steering means being activated in response to said bridge being unbalanced in a first direction and said second current steering means being activated in response to said bridge being unbalanced in a second direction; signal storage means connected to said second current steering means to store a control signal during the presence of said first half cycle energy in response to said second current steering means being activated; current switching means having input means, output means and control means, said control means being connected to said signal storage means to cause said current switching means to be turned on during the presence of said second half cycle energy in response to said signal storage means storing said control signal, said input means connected to said first terminal of said source of a. c. electrical energy and said output means connected to said second terminal of said source of a. c. electrical energy; heating means connected to said current switching means to be turned on only in response to said current switching means being switched on during the presence of said half cycle electrical energy.

2. A circuit for monitoring a temperature related condition and controlling a heater device according to claim 6 wherein said first current steering means comprises a transistor whose base element is circuitry connected to said second terminal of said source of a. c. electrical energy and whose emitter element is connected to said first output terminal of said bridge circuit and whose collector element is connected to said signal storage means and further wherein said second current steering means is a diode whose anode is connected to the base element of said transistor and whose cathode is connected to said second output terminal of said bridge circuit.

3. A circuit for monitoring a temperature related condition and controlling a heater device according to claim 1 wherein said current switching means comprises a silicon controlled rectifier and a relay coil associated with a relay, wherein said relay coil is series connected to said silicon controlled rectifier and wherein the control element of said silicon controlled rectifier is connected to said storage means such that when said signal storage means has stored a control signal thereat this control signal biases said silicon controlled rectifier so that during the presence of said second half cycle energy said silicon controlled rectifier is turned on to conduct current through said relay coil and through said silicon controlled rectifier thereby activating the relay associated with said relay coil.

* * * * *